INVENTORS
RENATUS S. BEZ
EDWARD L. ALLEN
BY
Daniel W. Tillott
ATTORNEY

Feb. 21, 1967  R. S. BEZ ET AL  3,305,031
POWER HAMMER

Filed Feb. 1, 1965  2 Sheets-Sheet 2

INVENTORS
RENATUS S. BEZ
EDWARD L. ALLEN
BY
David W. Tillott
ATTORNEY large
3,305,031
POWER HAMMER
Renatus S. Bez, Sayre, and Edward L. Allen, Athens, Pa., assignors to Ingersoll-Rand Company, New York, N.Y., a corporation of New Jersey
Filed Feb. 1, 1965, Ser. No. 429,289
4 Claims. (Cl. 173—115)

This invention relates to percussive drilling tools driven by rotary motors. More particularly, this invention relates to electric hammer drills.

In electric hammer drills, it is desirable to vary the stroke of the reciprocating hammer in order to vary the impact or blow energy delivered to the drill bit. Such a change, for example, may be desirable when shifting between drilling in materials having different characteristics.

The principal object of this invention is to provide a simple and economical mechanism for varying the length of the stroke of a hammer drill driven by a rotary motor.

Another important object is to provide a hammer drill of the above type which can be easily and quickly adjusted to vary its length of stroke.

The invention is described in connection with the accompanying drawings wherein.

Figures 1, 2:
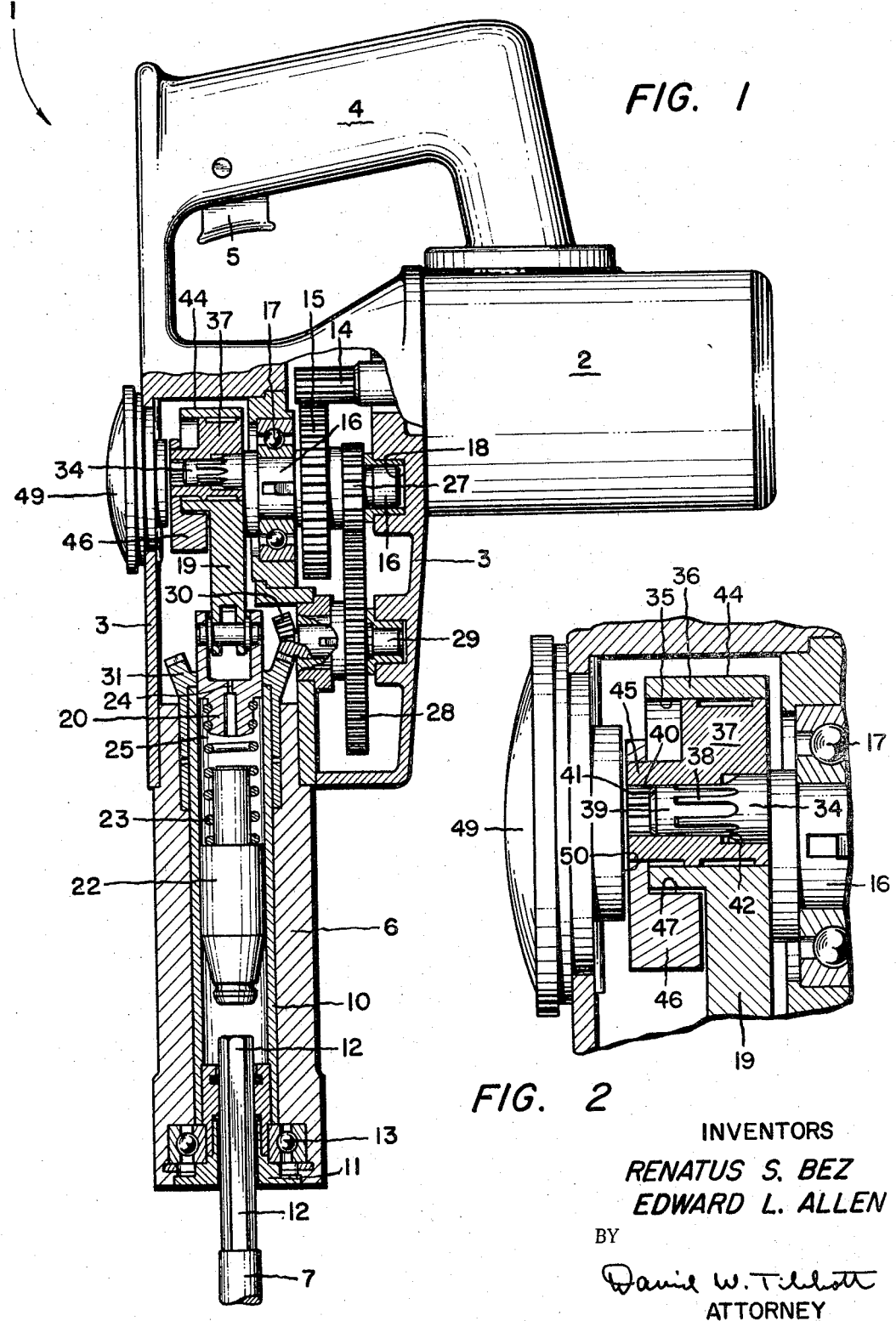
FIG. 1 is an elevational view with portions cut away of an electric hammer drill embodying this invention.
FIG. 2 is a fragmentary and enlarged view of a portion of FIG. 1 showing the stroke adjusting mechanism.
Figure 3:
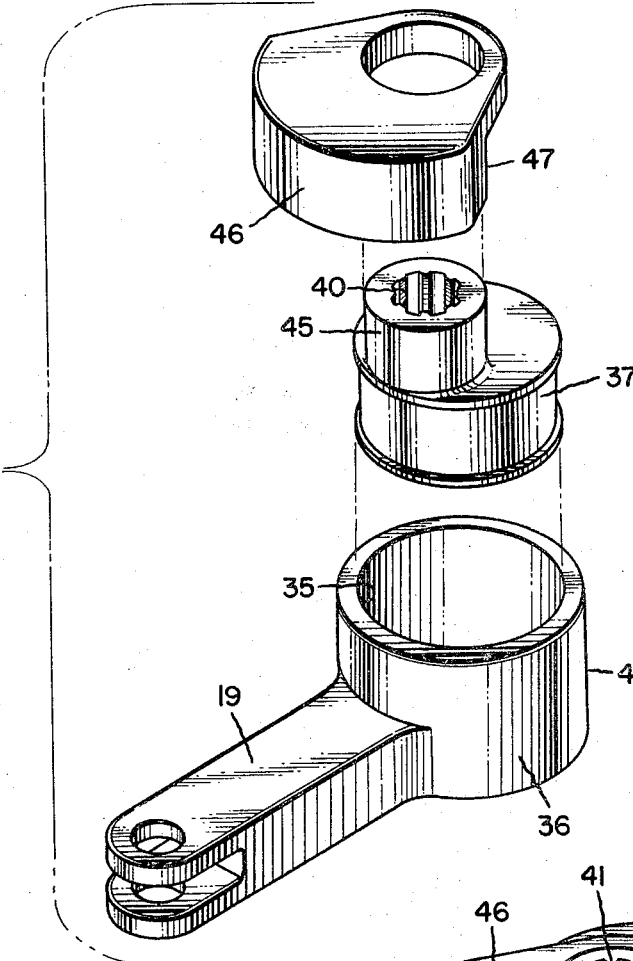
FIG. 3 is an exploded perspective view of the stroke adjusting mechanism.
Figure 4:
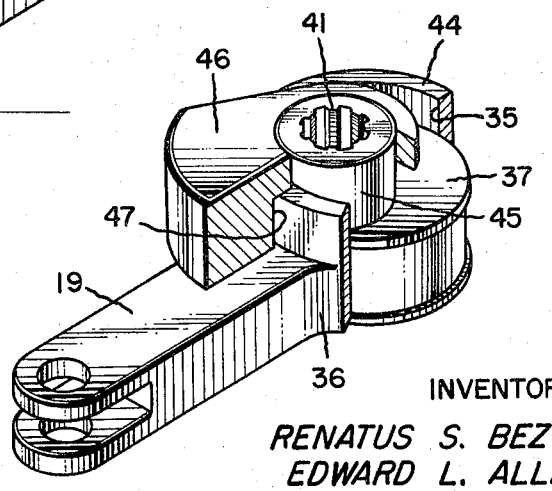
FIG. 4 is a perspective view of the stroke adjusting mechanism in an assembled position.

The electric hammer drill 1 shown in FIG. 1 conventionally includes an electric motor 2 mounted in a drive casing or frame 3 and a pistol grip handle 4 fixed on the casing 3 and carrying a trigger 5 for energizing the motor 2. The drive casing 3 carries a forwardly projecting barrel 6 adapted to hold a drill bit 7 at its forward end. This tool is useful for drilling holes in masonry and other hard materials.

The barrel 6 is hollow and contains a rotatably mounted hollow sleeve or cylinder 10. The cylinder 10 carries a chuck 11 at its front end adapted to receive the drill bit 7. The chuck 11 contains a hexagonally shaped hole for receiving the shank 12 of the drill bit 7. The shank 12 is hexagonally shaped when the drill bit 7 is to rotate with the chuck 11 as shown in FIG. 1. If it is desired that the drill bit not rotate with the chuck 11, a bit is selected having a cylindrical shank which is free to rotate in the chuck 11. The chuck 11 is rotatably mounted in a ball bearing 13 attached in the front end of the barrel 6.

The motor 2 has a small pinion 14 fixed on the end of its rotor driving a larger gear 15. Gear 15 is fixed on a drive shaft 16 which is rotatably mounted in ball bearings 17 mounted in the drive frame 3. The lower end of the drive shaft 16 is journaled in a bearing socket 18 formed in the frame 3. The drive shaft 17 drives a connecting rod 19 which has its forward end pivoted to a master piston 20 sliding in the rear end of the cylinder 10.

A slave piston 22 is slidably mounted in the cylinder 10 between the chuck 11 and the master piston 20 with a compression spring 23 interposed between the master and slave pistons 20 and 22. The master piston 20 includes a limited area vent 24 for communicating the space 25 in the cylinder 10 between the two pistons 20 and 22 with the atmosphere.

The operation of the master and slave pistons 20 and 22 is conventional and forms no part of this invention. As the master piston 20 moves forward, the slave piston 22 is prevented from moving forward by engagement against the end of the drill bit shank 12 so that the air in the space 25 between the pistons 20 and 22 is forced out the vent 24. At the same time, the spring 23 is compressed by the approach of the master piston 20 toward the slave piston 22. As the master piston 20 reverses its movement and moves rearwardly, it drags the slave piston with it, due to the vacuum in the space 25 holding the two pistons 20 and 22 together. Meantime, air is leaking through the vent 24 and into the space 25 allowing the slave piston 22 to start forward under the action of the spring 23. When the motor piston 20 again reverses its movement and starts forward, it begins adding additional force urging the slave piston 22 forward. At some time during the forward stroke of the master piston 20, the slave piston 22 impacts the shank 12 of the drill bit 7. Thereafter the operation of the two pistons 20 and 22 is repeated, so that the drill bit 7 is repeatedly hammered by the slave piston 22.

As the drill bit 7 is hammered axially, it is simultaneously rotated. A small gear 27 is fixed on the drive shaft 16 and engages a large bull gear 28 which is rotatably mounted in the forward end of the frame 3. A stub shaft 29 is splined in the bull gear 28 and carries a bevel pinion 30 at its upper end. The bevel pinion 30 engages and drives a bevel gear 31 fixed on the rear end of the rotating cylinder 10. Thus, the foregoing "bit-rotating" gear train consecutively includes the small gear 27 fixed on the drive shaft 16, bull gear 28, stub shaft 29, bevel pinion 30, bevel gear 31, cylinder 10, chuck 11, and the drill bit 7.

The novelty in this application rests in the connection of the drive shaft 16 to the connecting rod 19 providing a means for varying or adjusting the length of the stroke of the connecting rod 19 and the master piston 20. This connection means is referred to as a variable eccentric means.

The end of the drive shaft 16 remote from the motor 2 carries an eccentrically positioned pin 34 which projects through the bore 35 formed in the big end 36 of the connecting rod 19. The bore 35 is considerably larger than the eccentric pin 34 and a second eccentric 37 is mounted on the pin 34 and journaled in the bore 35. The eccentric pin 34 carries external splines 38 which run longitudinally along the pin and terminate short of the end of the pin 34, thus leaving an end portion 39 on the pin 34 free of splines.

The second eccentric 37 contains a hole 40 located eccentrically to its periphery. The hole 40 contains internal splines 41 adapted to mate with the splines 38 on the pin 34. The splines 41 extend longitudinally less than the full width of the second eccentric 37, leaving a splineless portion 42 of the hole 40 adjacent the root of the pin 34.

As seen in FIG. 2, when the second eccentric 37 is fully seated on the pin 34, the external splines 38 engage the internal splines 41 for a substantial length. Due to the absence of splines on portions 39 and 42 of the pin 34 and the second eccentric 37, respectively, the second eccentric 37 can be lifted partly off the pin 34 until the splines are disengaged and rotated relative to the pin 34 to a new position where the splines can be re-engaged by again seating the second eccentric 37 on the pin 34.

Since the pin 34 is eccentrically positioned on the drive shaft 16 and the second eccentric 37 is eccentrically positioned on the eccentric pin 34, it should be apparent that the angular adjustment of the second eccentric 37 relative to the first eccentric 34 results in varying the eccentric throw of the second eccentric 37 relative to the drive shaft 16. As a result, this adjustment varies the length of stroke of the connecting rod 19.

The connecting rod 19 includes a circular flange 44 circling the bore 35 and projecting from the face of the connecting rod remote from the motor 2. The second eccentric 37 includes a boss 45 circling the hole 40 and projecting a short distance above the flange 44. A counterweight 46 is fixed on the boss 45 by a press fit. It could also be welded on the second eccentric 37 or be made integral therewith. The counterweight 46 includes a shoulder 47 which is spaced slightly from the flange 44. The counterweight 46 tends to counterbalance the weight of the second eccentric 37 to reduce vibration in the tool.

The counterweight 46 and second eccentric 37 are prevented from moving out of adjusted positions by a removable cap 49 releasably mounted in the frame or case 3 adjacent the stroke adjustment means. The cap 49 includes an inner face 50 adapted to be located near the counterweight 46 and second eccentric 37, when these elements are in operative position, so that the eccentric 37 cannot move on the eccentric pin 34 until the cap 49 is removed.

It should be understood that although only one embodiment of the invention is specifically described, the invention may embrace various other embodiments which are obvious from an understanding of the described embodiment and are embraced within the claims of the invention.

Having described our invention, we claim:
1. A drilling tool comprising:
   (a) a frame;
   (b) a rotary motor mounted on said frame;
   (c) a chuck mounted on the end of said frame and adapted to hold a drill bit;
   (d) a percussive means including a connecting rod and adapted to axially hammer the drill bit held in said chuck;
   (e) drive means interconnecting said connecting rod to said motor for reciprocating said connecting rod, said drive means including a drive shaft and an eccentric means interconnecting said drive shaft and one end of said connecting rod;
   (f) said eccentric means including a first eccentric fixed on said drive shaft to rotate with the drive shaft and a second eccentric keyed on said first eccentric and journaled in said one end of said connecting rod; and
   (g) means for adjusting said second eccentric angularly relatively to said first eccentric to a variety of keyed positions to vary the length of the stroke of said eccentric means and said connecting rod.

2. The tool of claim 1 wherein:
   (a) said first and second eccentrics are keyed together by interengaging splines which allow said second eccentric to be angularly adjusted relative to said first eccentric.

3. The tool of claim 2 wherein:
   (a) the splines on one of said eccentrics are limited to extending axially for less than the axial length of that eccentric so that said eccentrics can be adjusted by disengaging said splines without said eccentrics being entirely disengaged.

4. The tool of claim 3 including:
   (a) a removable abutment means in said frame to loosely abut said eccentrics when in place in said frame to prevent said eccentrics from moving axially to positions wherein their splines are disengaged; and
   (b) said abutment means being adapted to be readily removed from said frame to allow said eccentrics to be adjusted.

References Cited by the Examiner

UNITED STATES PATENTS

| | | | |
|---|---|---|---|
| 1,875,180 | 8/1932 | Rider | 74—571 |
| 1,959,516 | 5/1934 | Baker | 173—115 |
| 2,592,237 | 4/1952 | Bradley | 74—571 |
| 2,933,049 | 4/1960 | Johnston | 74—571 |
| 2,942,852 | 6/1960 | Muthmann | 173—115 |
| 3,160,217 | 12/1964 | Raihle | 173—115 |
| 3,161,242 | 12/1964 | Etzkorn et al. | 173—116 |

FRED C. MATTERN, Jr., *Primary Examiner.*

L. P. KESSLER, *Assistant Examiner.*